United States Patent
Nijim et al.

(10) Patent No.: US 10,631,029 B1
(45) Date of Patent: Apr. 21, 2020

(54) VIEWING RECOMMENDATIONS BASED ON SENSOR DATA

(71) Applicant: Cox Communications, Inc., Atlanta, GA (US)

(72) Inventors: Yousef Wasef Nijim, Cumming, GA (US); Jay Paul Langa, Cumming, GA (US); Anant Patil, Marietta, GA (US); Catherine Elizabeth Thompson, Roswell, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 15/417,124

(22) Filed: Jan. 26, 2017

(51) Int. Cl.
*H04N 7/173* (2011.01)
*H04N 21/25* (2011.01)
*H04N 21/466* (2011.01)

(52) U.S. Cl.
CPC ....... *H04N 21/251* (2013.01); *H04N 21/4668* (2013.01)

(58) Field of Classification Search
CPC .......... H04N 21/4756; H04N 21/4826; H04N 21/454; H04N 21/4932; H04N 21/4821; H04N 21/251; H04N 21/23439
USPC ...................... 725/9, 10, 12, 14, 25, 37, 116
See application file for complete search history.

(56) References Cited

U.S. PATENT DOCUMENTS

| | | | |
|---|---|---|---|
| 2011/0134026 A1* | 6/2011 | Kang | G06F 3/011 345/156 |
| 2015/0067708 A1* | 3/2015 | Jensen | H04N 21/4756 725/10 |
| 2015/0229975 A1* | 8/2015 | Shaw | G06F 16/24 725/10 |

* cited by examiner

*Primary Examiner* — Jivka A Rabovianski
(74) *Attorney, Agent, or Firm* — Merchant & Gould P.C.

(57) ABSTRACT

Aspects of the present disclosure provide systems, methods, computer readable media, and/or other subject matter that enable use of sensor data to provide content recommendations, but are not so limited. A disclosed system operates to receive attributes of at least one human subject from one or more sensors as part of identifying recommended content items for display. A disclosed method operates to use one or more sensor data mapping parameters as part of identifying recommended content items for display.

20 Claims, 9 Drawing Sheets

FIGURE 1

| Sensor Type | Output Value or Range | Mood | Recommendation Group or Item |
|---|---|---|---|
| Pressure | | | |
| | A | 1 | a |
| | B | 2 | b |
| GSR | | | |
| | C | 3 | c |
| | D | 4 | d |
| Temperature | | | |
| | E | 1 | a |
| | F | 2 | b |
| Heart Rate | | | |
| | G | 3 | c |
| | H | 4 | d |
| Camera | | | |
| | I | 5 | e |
| | J | 6 | f |
| Microphone | | | |
| | K | 3 | c |
| | L | 4 | d |

VIEWING RECOMMENDATIONS BASED ON SENSOR DATA

BACKGROUND

Digital cable service providers provide services to subscribers that include access to the Internet, video on-demand, television programming, and other services via an associated network that typically includes fiber optic and/or coaxial cable infrastructure. A subscriber may have access to hundreds of channels of linear content and thousands of pre-recorded "on-demand" movies and television shows. Linear content is referred to as a scheduled television program offered at a particular time and presented on a particular channel. Some service providers use a user profile and/or viewing history to assist in identifying relevant content for a user. For example, a service provider may use a user's viewing history to predict television shows that may be of interest to a particular subscriber or consumer. However, service providers systems do not account for a current mood or demeanor of a subscriber when making recommendations.

SUMMARY

Aspects of the present disclosure provide systems, methods, computer readable media, and/or other subject matter that enable use of sensor data to provide content recommendations, but are not so limited. A system of an embodiment operates to receive attributes of at least one human subject from one or more sensors as part of identifying recommended content items for display. A method of an embodiment operates to use one or more sensor data mapping parameters as part of identifying recommended content items for display.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Figure 1:
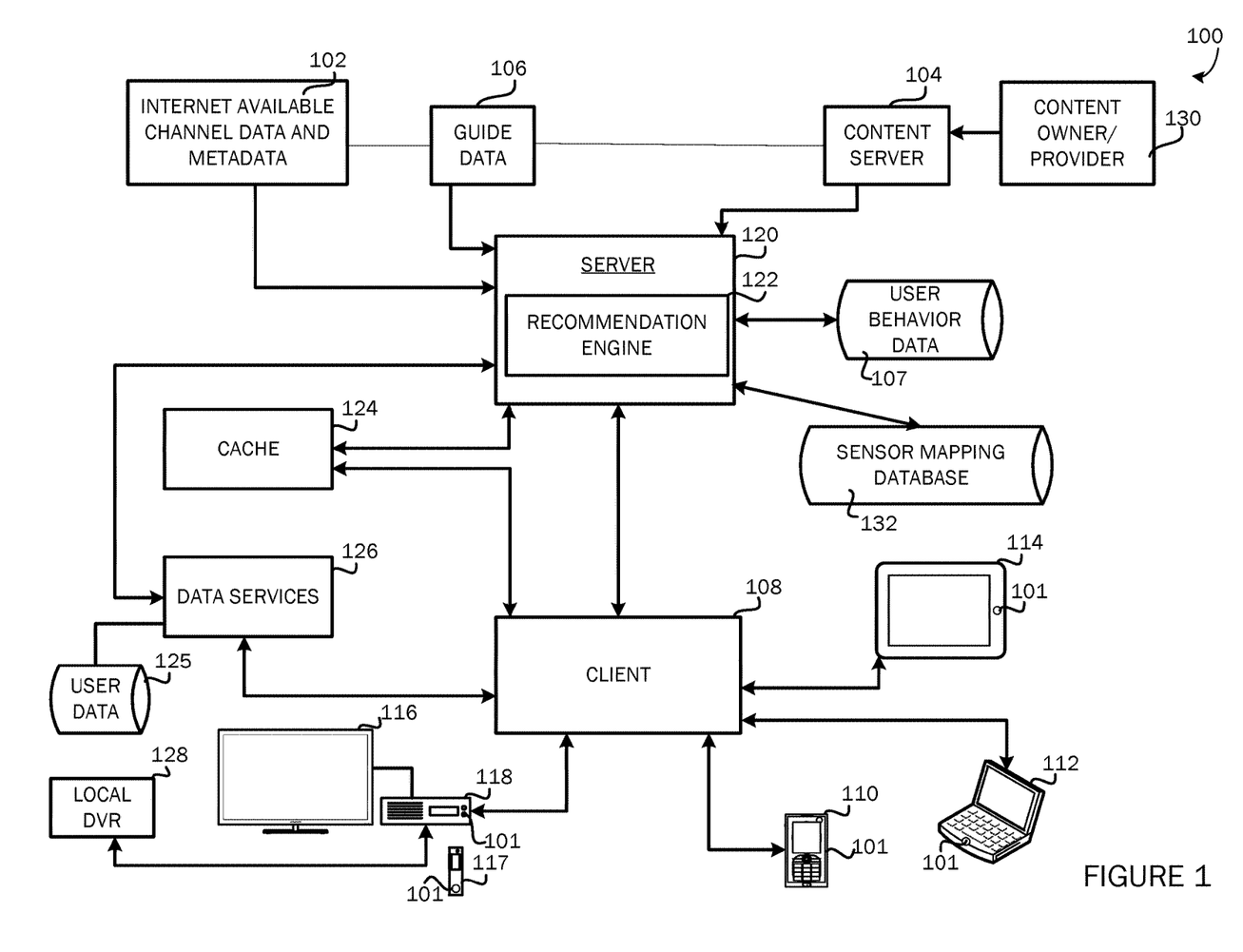
FIG. 1 is a block diagram of an exemplary system that provides viewing recommendations to users of a service provider network based in part on detected biometric information and/or physiological attributes of the users in accordance with an embodiment.

FIG. 1 is a block diagram of an exemplary system 100 that provides viewing recommendations to users of a service provider network, such as an Internet and/or television programming provider for example, based in part on detected biometric information and/or physiological attributes of the users, but is not so limited. The system 100 of an embodiment incorporates the use of detected biometric information and/or physiological attributes of a user as part of identifying viewing recommendations and/or other recommended information, such as television programming and/or movies offered via service provider services for example. Biometric and/or physiological attribute detection can use sensor measurements from one or more sensors to quantify biological and/or physiological attributes that include fingerprint data, facial geometry and expression data, retina and iris pattern data, voice pattern and pitch data, skin temperature data, perspiration data, pressure or applied force data, heart rate data, blood oxygen data, etc.

As described below, the system 100 of an embodiment includes a remote control device, such as a television or set-top box remote control, tablet, smart phone, or other device as non-limiting examples, that includes one or more integrated or coupled sensors configured to detect biometric data and/or physiological attribute data as part of identifying and providing users with viewing recommendations that include television programs, movies, and/or other content, but is not so limited. Embodiments also encompass wearable technology that can be used to detect biometric and/or physiological attribute data which can be conveyed to a recommendation engine 122 or other component for further processing, as described further below. For example, a fitness band can be equipped with one or more sensors such as a heart rate sensor (e.g., optical and/or acoustical sensor) and/or a perspiration sensor (e.g., galvanic skin response (GSR) sensor) and wireless or wired technology that can be used to convey the sensor data, directly or indirectly, to recommendation engine 122 or another component that identifies recommendation content items based on the sensor data.

As shown in the example of FIG. 1, system 100 includes a set-top box (STB) 118 coupled to television 116 and/or local digital video recorder (DVR) 128. Remote control 117 can be used to control aspects of STB 118, DVR 128, and/or television 116. According to an embodiment, remote control 117 can be outfitted with one or more sensors that provide sensor data to determine a user mood and identify one or more viewing recommendations based on the user mood. For example, the remote control 117 can be outfitted or integrated with one or more of a pressure sensor, a skin temperature sensor, a heartbeat sensor, a microphone, a camera, etc. Sensor data output provided via remote control 117 can be further integrated with other sensor data. For example, television 116, STB 118, tablet 114, smart phone 110, can include one or more sensors, including digital cameras and/or microphones for example, that can sense and collect data, such as image and voice data for example, which may be communicated to recommendation engine 122 of application server 120 and combined with the output of remote control 117. As a further example, a wearable fitness band can include one or more sensors that provide sensor data which may be communicated via a wired or wireless interface to another component, such as remote 117, STB 118, DVR 128, etc., and are used to provide viewing recommendations. It will be appreciated that any of the devices may be outfitted with different types of sensors and are not limited to any sensor type.

According to various embodiments, sensor data can be fed to recommendation engine 122, which uses a processor to execute a recommendation algorithm to identify one or more viewing recommendations or recommended content items based on the sensor data and/or other information. For example, after a user logs in to system 100, the recommendation engine 122 executes the recommendation algorithm using collected sensor data, user profile information, and/or past viewing history to identify one or more recommendations for the logged in user. Additional filtering may be applied by the recommendation algorithm, such as paring down recommended results based on age, gender, ethnicity, time of day/week/month/season, etc. Recommendations provided by recommendation engine 122 can be stored with server 120 or another component or in cache 124 for efficient retrieval.

Accordingly, the recommendation engine 122 of an embodiment is configured to provide programming recommendations and/or other viewing recommendations in real-time or near real-time to a user based on a current mood or physiological condition according to the measured physiological or biometric parameters of the user. The recommendation engine 122 may use a variety of sources for providing recommendations in conjunction with the sensor data, such as, but not limited to, content information (e.g., linear content items, non-linear content items, etc.) and/or user-specific information (e.g., viewing history, recording history, user profile information, subscription entitlement information, etc.). The recommendation engine 122 of one embodiment operates using the recommendation algorithm to rank available content based in part on collected sensor data. A number of top ranking content items (e.g., live programs, video on-demand content, DVR content, etc.) are selected as recommended content and provided to the user via STB 118, a cable adapter, or another device.

As described below, the sensor mapping database 132 can be configured to map sensor data to a mood type which, in turn, can be mapped to one or more recommendations (see FIG. 2 for example). The recommendation engine 122 of one embodiment uses the sensor mapping database 132 and a recommendation algorithm to rank recommended content items according to a current mood, content item genre, and/or other criteria. For example, the recommendation engine 122 can use the recommendation algorithm to rank recommended content items according to a "happy" mood type based on the sensor data and/or sensor mapping database 132 by recommending adventure programs first, followed by drama programs, followed by action programs, etc. As another example, the recommendation engine 122 can use the recommendation algorithm to rank recommended content items according to an "unhappy" mood type based on the sensor data and/or sensor mapping database 132 by recommending comedy programs first, followed by inspirational programs, followed by animated programs, etc.

According to one embodiment, each time a user uses remote control device 117 or another device operable to output sensor data, new sensor data are captured and/or updated recommendations can be identified by the recommendation engine 122 if warranted. A user may be presented with an option to opt-in to the use of sensor data to provide recommendations. The recommendation algorithm of one embodiment uses sensor data as an input to one or more additional filtering stages to provide recommended content items. A user may be given an option to decline the additional filtering and/or decline monitoring and/or collection of sensor data. Likewise, a user may be given an option to accept recommended content items to watch or store for later viewing.

With continuing reference to FIG. 1, system 100 includes mobile communication device or smart phone 110 wired and wireless computing devices (e.g., laptop computer 112, and tablet computer 114). According to various embodiments, one or more sensors (depicted in FIG. 1 as reference number 101) can be incorporated into one or more of the remote control 117, STB 118, television 116, smart phone 110, laptop computer 112, and/or tablet computer 114. Reference number 101 may refer to a single sensor type or a plurality of sensor types. Each type of sensor 101 includes associated detection hardware, firmware, and/or software. In certain embodiments, one or more sensor types can be manufactured using system on a chip (SoC) technology. Sensor 101 can be configured to detect various physiological and/or biometric parameters of a user as described above. As can be appreciated, output from sensor 101 can be stored in raw form and/or digitized and stored in a digital form in local and/or remote storage devices or mediums. It may be preferable to store raw sensor data in secure local computer readable storage to reduce a likelihood of compromising the raw data.

Client 108 is configured to interact with server 120 as part of conveying sensor data, registering sensor types, and/or mapping sensor data to mood types. Mapped sensor data can be stored in sensor mapping database 132, as described below with respect to FIG. 2. Sensor mapping database 132 can be used to store the various mapping parameters on a user or group basis, but is not so limited. The registered sensor types can be used to quantify a user's mood and thereby identify recommendations based on the user's mood. Once the sensors are registered, the client 108 can be used to convey sensor data to server 120 for further processing by the recommendation engine 122 to provide mood-based recommendations. Collected sensor data allows an associated user to obtain mood-based recommendations based on a current mood or physiological condition from a service provider or other entity.

As part of a sensor registration process, the system 100 of one embodiment provides an option to allow users to define mapping parameters according to certain sensor types and/or mood types. For example, a user may prefer to define a mapping between excessive sweat detection and/or excessive pressure detection to an "excited" or "anxious" mood type which maps to calming recommended program types. As another example, during registration, a user may prefer to define a mapping between a certain facial expression and/or a body position to an "unhappy" or "bored" mood type which maps to action-oriented or upbeat recommended program types. Registration is not required and each sensor can be configured with default mappings based on respective sensor output values.

Upon a receiving a sensor output by one or more sensors 101, the system 100 operates to identify and/or provide recommended content from a service provider system or other entity to an associated user according to corresponding mapping parameters, as described above. For example, a user may use remote control 117 to power on STB 118 by grasping the remote 117 that includes a GSR sensor and a temperature sensor, whereby the client 108 sends a signal requesting mapping parameters from server 120 or sensor mapping database 132 or another component based on the outputs of the GSR sensor and a temperature sensor in order to provide viewing recommendations to the user. As another example, a user may use tablet 114 as a remote control device to change a channel by holding the tablet 114 that includes a camera and a heartbeat sensor, whereby the client 108 sends a signal requesting mapping parameters from server 120 or sensor mapping database 132 or another component based on the outputs of the camera and heartbeat sensor in order to provide viewing recommendations to the user. In some embodiments, one type of sensor output may be given precedence over another type of sensor output. For example, output from a digital camera may be given precedence over output from a temperature sensor and relied upon solely to provide viewing recommendations. Or, sensor outputs may be combined to provide viewing recommendations based on an aggregation of sensor output. In one embodiment, television 116 or another device display can be used to display an overview of mapping parameters for each sensor on a per user basis. The overview can also be used to edit mapping parameters without having to re-register or identify an associated sensor.

Components of the system 100 may operate as a distributed system where each component is accessed via a suitable network, or the components may operate together as an integrated system. Internet-available channel data and metadata 102, content server 104, guide data 106, and/or mapping parameters may be provided and used to convey viewing recommendations and/or other information to users of the system 100. For example, Internet-available channel data and metadata 102 may include recommended video content data and metadata available on the Internet, such as YOUTUBE®, HULU®, etc. Content server 104 may include video content data and metadata available via a service provider, such as cable television (CATV) services and/or Internet system (as illustrated and described below with reference to FIG. 6), satellite television/Internet provider, etc. The data and metadata may include information such as personalized data and/or settings, video content titles, storylines, casts, genres, ratings, release dates, images, etc.

A content source can include linear and/or non-linear content available to the consumers via a service provider or other source, but is not so limited. For example, the broadcasts of television programs carried via the content server 104, which may be temporarily spooled on computer-readable storage media or directly transmitted over the physical network, from television networks are included as content sources. As will be appreciated, content that is described as "broadcast" will include content that is unicast (e.g., from a source to a caching location (e.g., cache 124), between caching locations, and from a caching location to a consumer) as linear content. As described above, cache 124 can also be used to store user viewing recommendations based on sensor data associated with a particular user to reduce an amount of time required to provide associated recommendations and/or information from server 120 or other remote component.

Computers and devices used in the provision of recommendation services and/or information include one or more processors and memory storage devices, which can store instructions that when executed by the one or more processors enable the provision of services and/or information. Memory storage devices are articles of manufacture that include computer-readable storage media. The term computer-readable storage media does not include transmission media, but refers to hardware media used to store desired information for access by a computer or processor. Examples of computer-readable storage media include, but are not limited to, RAM, ROM, EPROM, EEPROM, solid state memory, such as flash memory, optical storage, such as CD-ROMs and DVDs, and magnetic storage devices, such as magnetic tape and magnetic disks.

With continuing reference to FIG. 1, guide data 106 may include channel information, programming information, network information, etc. DVR 128 stores content item recordings while recording from a TV 116 connected to STB 118, or recordings can be stored on an IP network when recording from IP enabled devices 110, 112, 114 respectively. Local DVR 128 can also be included as part of STB 118. User preferences and/or other information may be cached in cache 124, a memory storage device, or some other component. The cache 124 is illustrated in FIG. 1 as a remote element, but may be integrated with the server 120, client 108, STB 118, DVR 128, etc. According to one embodiment, cached information may be specific to a user or user profile based on detected sensor data. As described above, according to an embodiment, raw sensor data and/or digitized data can be stored locally or remotely in secure storage to reduce likelihood of compromising the data.

The system 100 may include a data services system 126 which may comprise information such as billing data, permissions and authorization data, user profile data, digitized sensor data, etc., that can be stored in user database 125. The data services system 126 may be accessed by the server 120 for mapping and/or using sensor data, checking permissions, subscriptions, profile data, past viewing data for associating channel, programming, guide data, etc. for specific users.

As described above, various endpoint devices may be utilized to capture and transmit sensor data as part of providing recommended television programming and/or other recommended content. The endpoint devices use display technology to display personalized information according to the sensor data and/or mapping parameters stored in sensor mapping database 132. For example, embodiments can use any video decoding display device that uses one or more graphics processors to display recommended content. As described above, exemplary endpoint devices can include, but are not limited to, a mobile communication device 110 or smart phone, a computing device 112, such as a desktop computer, a laptop computer, etc., a wireless computing device, such as a tablet computer 114, a television 116, such as an Internet-connected television or a television connected to a network-connected device, such as a STB 118, DVR 128, etc. The client 108 can be integrated with one or more endpoint devices. FIG. 1 provides one implementation example and it will be appreciated that other implementations of system 100 can be deployed.

Figure 2:
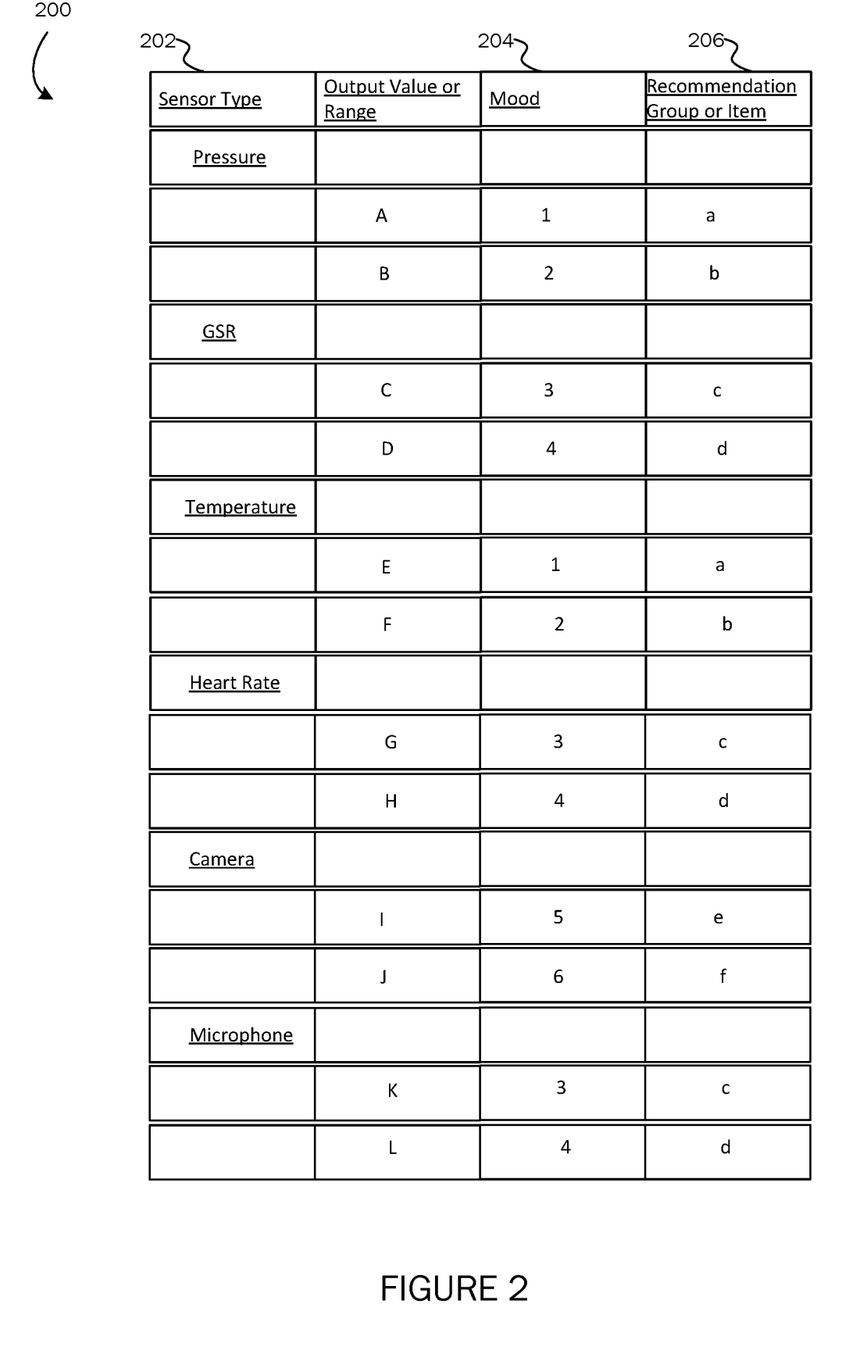
FIG. 2 depicts an exemplary sensor mapping database in accordance with an embodiment.

FIG. 2 depicts an exemplary sensor mapping database 200 (e.g., sensor mapping database 132) in accordance with an embodiment. As shown in FIG. 2, sensor mapping database 200 includes various sensor types 202, mood types 204, and recommended content items, genres, and/or content item groups 206. For this example, sensor mapping database 200 includes a pressure sensor type, a GSR sensor type, a temperature sensor type, a heart rate sensor type, a camera sensor type, and a microphone sensor type. A pressure sensor can be configured to output values associated with a range of applied force amounts, where the range can be used to quantify different mood types. For example, a large amount of applied force may correlate with anger or excitement, whereas a low amount of applied force may correlate with boredom or sadness. A GSR sensor can be configured to output values associated with a range of electrical conductance corresponding to perspiration amounts, where the range can be used to quantify different mood types. For example, a large amount of perspiration may correlate with anxiety or nervousness, whereas a low amount of perspiration may correlate with calmness or neutrality.

A temperature sensor can be configured to output values associated with a range of temperatures, where the range can be used to quantify different mood types. For example, a high temperature may correlate with anger or surprise, whereas a low temperature may correlate with calmness or neutrality. A heart rate sensor can be configured to output values associated with a range of heartbeats, where the range can be used to quantify different mood types. For example, a higher heartbeat may correlate with excitement or surprise, whereas a lower heartbeat may correlate with contentment or calmness. A camera can be configured to output images associated with a range of facial expressions, where the range can be used to quantify different mood types. For example, a first facial expression may correlate with anger, whereas a second facial expression may correlate with sadness. A microphone can be configured to output values associated with a range of volume or pitch, where the range can be used to quantify different mood types. For example, a higher pitch may correlate with surprise, whereas a lower pitch may correlate with docility.

Additionally, output from more than one sensor type can be used to validate mood type based on other sensor type outputs. For example, output from a heart rate sensor may be used to validate a "somber" mood based on output of a temperature sensor. Also, as described briefly above, outputs from multiple sensors can be combined to provide viewing recommendations. For example, output of a pressure sensor may indicate a "somber" mood type (e.g., type 1) whereas output of a heart rate sensor may indicate an "excited" mood type (e.g., type 3). Accordingly, one or more viewing recommendations from a first genre type or other recommendation grouping may be provided based on the pressure sensor output and one or more viewing recommendations from a second genre type or other recommendation grouping may be provided based on the heart rate sensor output. Additional or fewer sensors, sensor values, mood types, recommendations, etc. may be added to the sensor mapping database 200 according to the granularity afforded to each type of sensor. Exemplary mood types may include "unhappy," "happy," "angry," "afraid," "disgusted," "excited," "neutral," "distressed," "surprised," "joyful," "ashamed," "attentive," "inattentive," etc. Exemplary recommended content may include types such as "action," "adventure," "comedy," "drama," "horror," "crime," "animation," "musicals," "science fiction," "war," "western," "romance," "for children," "suspense," "for girls," "for guys," "holiday," etc.

As shown in the example of FIG. 2, sensor mapping database 200 includes output values for each sensor type, a mood type mapped to each sensor output value, and a recommended content item or group mapped to the mood type and/or sensor output value. It will be appreciated that sensor mapping database 200 can be used to track mapping parameters of a plurality of users of system 100 or a database instance may be associated with each user. As described above, additional filtering operations may be applied to each recommended content item to further refine how recommendations are provided to each user. FIG. 2 provides one implementation example and it will be appreciated that other implementations of sensor mapping database 200 and associated mapping parameters can be defined.

Figure 3:
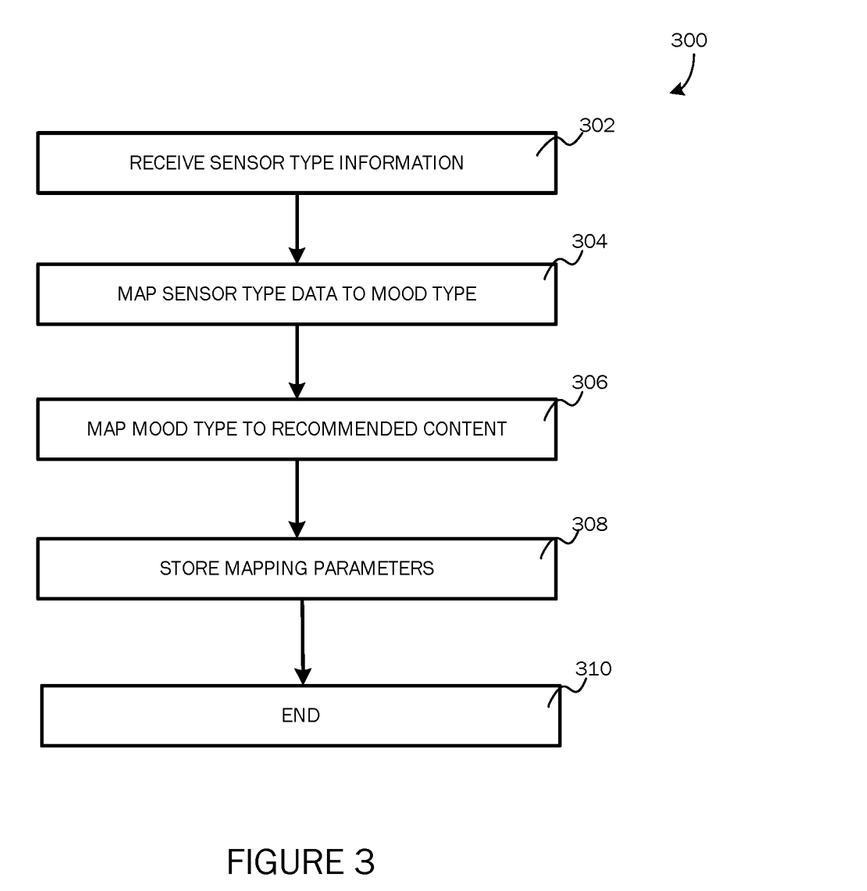
FIG. 3 is a flow diagram that depicts an exemplary process of generating a sensor mapping database for use in providing viewing recommendations to one or more users of a service provider system according to an embodiment.

FIG. 3 is a flow diagram that depicts an exemplary process 300 of generating a sensor mapping database (e.g. sensor mapping database 132 or 200) for use in providing viewing recommendations to one or more users of a service provider system (e.g., system 100), according to an embodiment. At 302, the process 300 receives sensor type information associated with one or more sensors that will be used in providing viewing recommendations to one or more users. For example, process 300 at 302 can receive a signal from client 108 that includes sensor type data associated with one or more sensors available to a user, such as temperature sensor data, heart rate sensor data, pressure sensor data, GSR sensor data, digital camera data, microphone data, etc. The sensor type data can be communicated to a backend component, such as recommendation engine 122, via STB 118 or some other device (e.g. smart phone 110 or tablet 114) operable to communicate the sensor type data. In one embodiment, the process 300 at 302 requires a user to download or otherwise access a service provider sensor registration application, such as a web page, television application, and the like, that coordinates process 300 based on a user identity. In one embodiment, upon receiving power, a STB 118 and/or television 116 operates to display a menu feature, guide feature, and/or other interactive display component that prompts the user to opt-in to receiving viewing recommendations based on sensor type data.

At 304, after receiving the sensor type data, the process 300 prompts the user to map mood types to the sensor type data or automatically assigns default mood types to the sensor type data if the user declines to perform the mapping. For example, the process 300 at 304 can automatically map mood types to sensor type data if the user declines to manually assign mood types to sensor type data. As an example, the process 300 at 304 can automatically map perspiration sensor data corresponding to different levels of perspiring output from a GSR sensor to different mood types. As another example, the process 300 at 304 can use one or more facial recognition algorithms to automatically map image data corresponding to different facial expressions output from a digital camera to different mood types. As yet another example, the process 300 at 304 can automatically map audio data corresponding to different pitch and/or volume levels output from a microphone to different mood types.

At 306, the process 300 operates to map the mood type data to one or more recommended content items or content item groups. For example, the process 300 at 306 can use mapping rules that operate to map: a first mood type to a first type of content item to be provided as recommended content based on the first mood type, a second mood type to a second type of content item to be provided as recommended content based on the second mood type, a third mood type to a third type of content item to be provided as recommended content based on the third mood type etc. At 308, the process 300 operates to store the mapping parameters to computer readable storage and the process 300 ends at 310. In one embodiment, the process 300 at 308 stores the mapping parameters in sensor mapping database 132 or 200. As described above, the mapping parameters can then be used to provide recommendations based on a user mood or other physiological condition.

Figure 4:
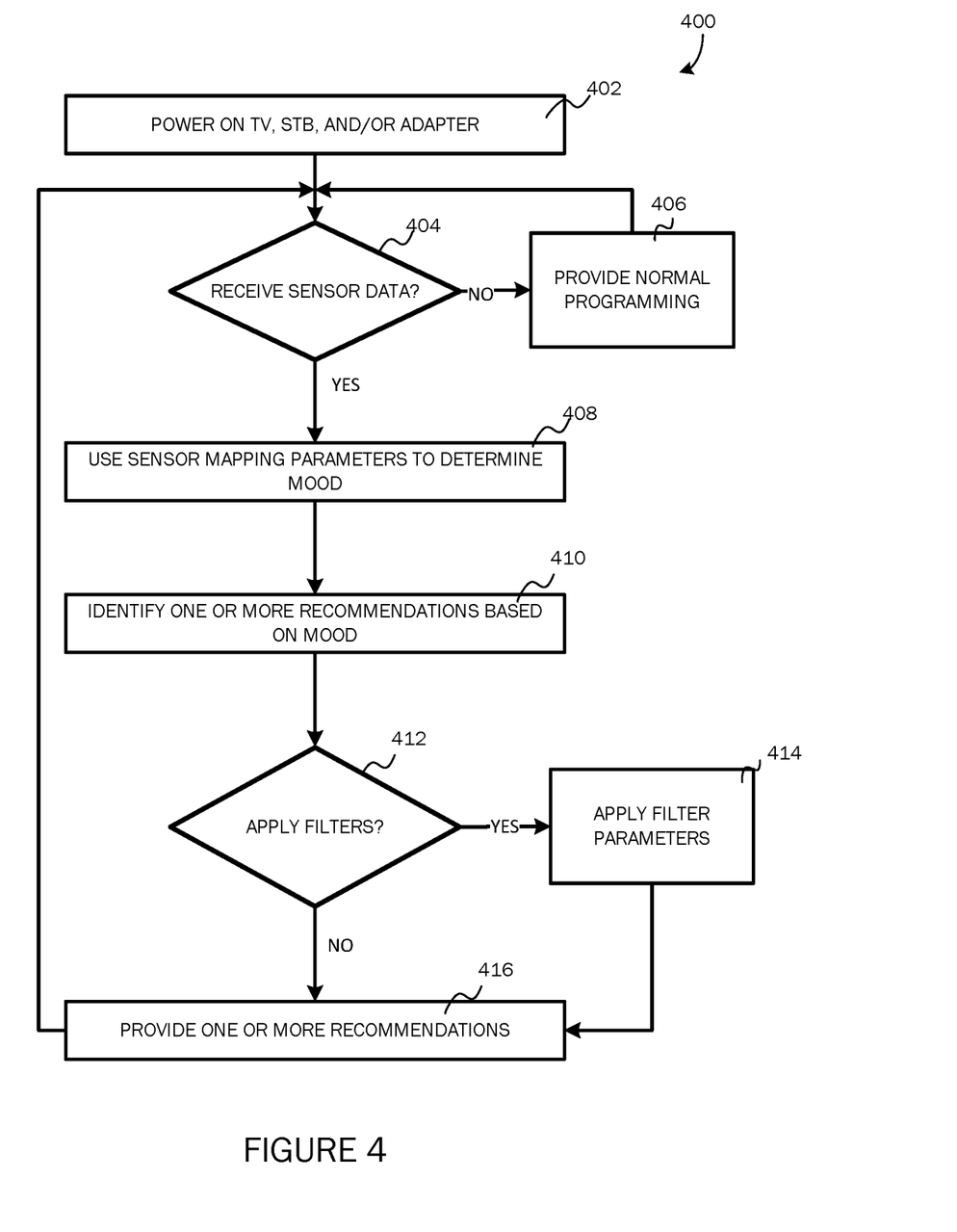
FIG. 4 is a flow diagram that depicts an exemplary process of providing one or more recommended content items associated with detected physiological attributes of a user according to an embodiment.

FIG. 4 is a flow diagram that depicts an exemplary process 400 of providing one or more recommended content items associated with detected physiological attributes of a user, according to an embodiment. At 402, the process 400 begins when a television 116, STB 118, or adapter is powered on and television programming and/or other services are received. If sensor data are not received via STB 118 or adapter at 404, the process 400 proceeds to 406 and provides default programming guide features and television programming to the user. If sensor data are received via STB 118 or adapter at 404, the process 400 proceeds to 408 and uses mapping parameters to determine a mood of the user. For example, a user may use remote 117 equipped with one or more sensors to power on television 116, STB 118, or adapter, wherein sensor data, such as applied force data and skin temperature data for example, are output by the one or more sensors and conveyed from remote 117 to a backend or other component via television 116, STB 118, the adapter, or some other component for further processing. As another example, a user may use smart phone 110 equipped with one or more sensors to interact with television 116, STB 118, or adapter, wherein sensor data, such as image data and audio data for example, are output by the one or more sensors and conveyed by the smart phone 110 via a cellular communication channel or a WIFI channel to a backend or other component for further processing.

At 410, the process 400 operates to identify one or more recommended content items based on the mood of the user according to the sensor data. For example, the process 400 can use recommendation engine 122 and mapping parameters of sensor mapping database 132 to identify and rank one or more recommended television programs, on-demand movies, or other content items for the user based on the user's mood according to the sensor data. If one or more additional filters are to be applied at 412, the process 400 proceeds to 414 and applies the additional filters before proceeding to 416. For example, one or more of an age-based filter, a gender-based filter, an ethnicity-based filter, a time of day/season-based filter may be applied to reduce the number of recommended content items to provide to the user. If one or more additional filters are not to be applied at 412, the process 400 proceeds to 416. At 416, the process 400 operates to provide the one or more recommended content items to the user for display before returning to 404. Recommended content items may be displayed in a programming guide or other display format for selection and playback by the user.

Figure 5A:
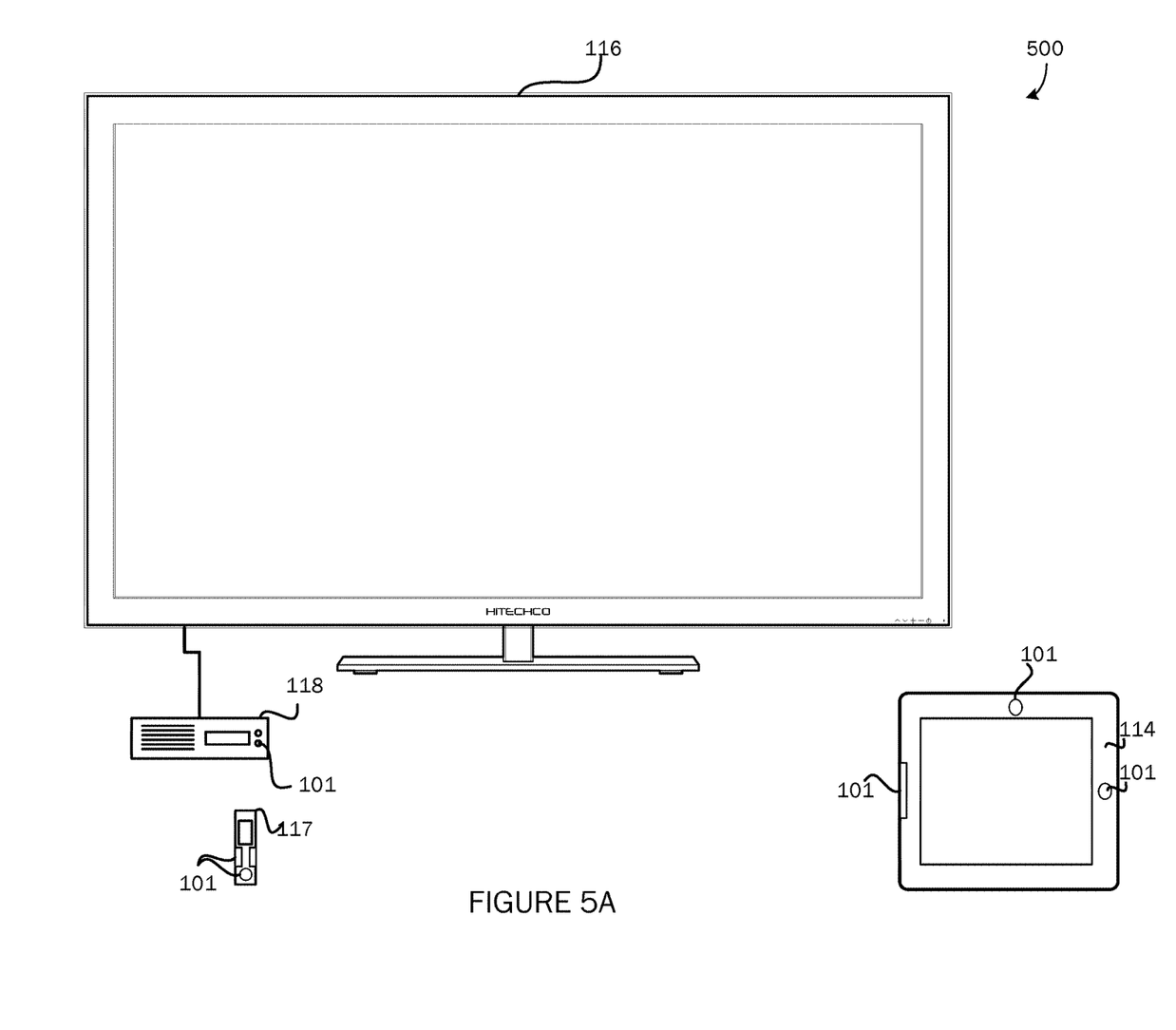
FIGS. 5A-5B depict aspects of an exemplary interactive system at a high level that utilizes sensor data to determine a user mood and provide one or more recommended content items from a service provider or other entity.
Figure 5B:
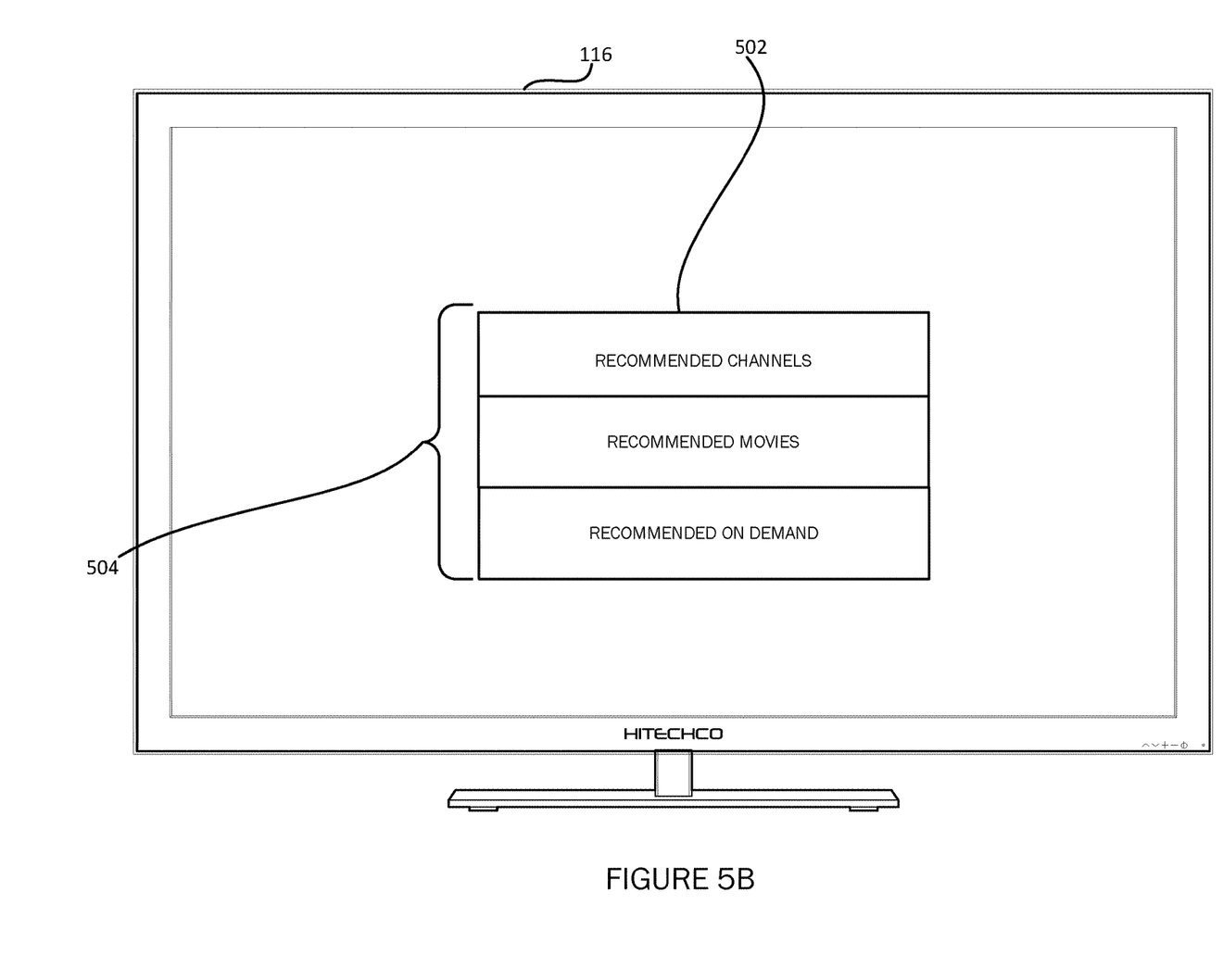

FIGS. 5A-5B depict aspects of an exemplary interactive system 500 at a high level that utilizes sensor data to determine a user mood and provides one or more recommended content items from a service provider or other entity. As shown in FIG. 5A, system 500 includes, but is not limited to, a high definition television 116, a STB 118, a remote control 117 that includes one or more sensors (shown collectively as 101), and a tablet 114 that includes one or more sensors (shown collectively as 101). As described above, a user can use the remote 117 or tablet 114 to interact with STB 118 and/or television 116, whereby the one or more sensors detect physiological attributes or conditions of the user which can be used to determine a mood of the user and, in turn, be used to identify one or more recommended content items, such as recommended television shows, movies, etc. in real-time or near real-time.

FIG. 5B depicts television 116 displaying a programming guide 502 that includes one or more recommended content items 504 (e.g., television programming items, video on demand items, etc.) based on the user's mood according to sensor data output by the one or more sensors. As one example, recommended content items 504 may be displayed with default programming of the programming guide 502 or displayed as a separate interface in conjunction with the default programming.

Figure 6:
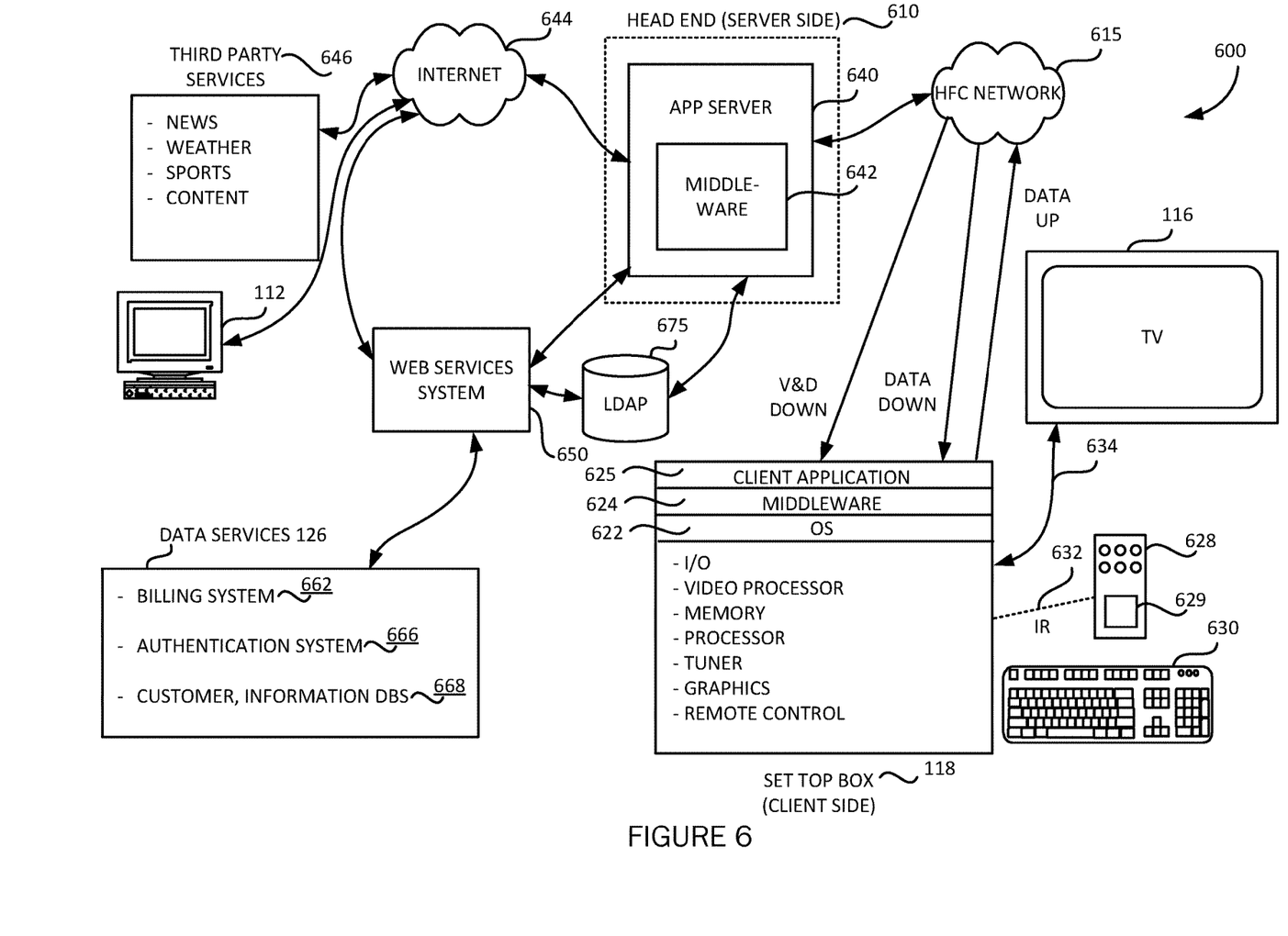
FIG. 6 is a block diagram illustrating a cable television services system architecture providing an operating environment according to an embodiment.

FIG. 6 is a block diagram illustrating a cable television services system 600 (hereafter referred to as "CATV") architecture providing an operating environment according to an embodiment. As should be appreciated, a CATV services system 600 is but one of various types of systems that may be utilized for providing an operating environment for providing functionality described herein. Referring now to FIG. 6, digital and analog video programming, information content and interactive television services are provided via a hybrid fiber coax (HFC) network 615 to a television 116 for consumption by a cable television/services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the STB 118 and the application server 640 of the embodiment.

The CATV system 600 is in the form of a distributed client-server computing system for providing video and data flow across the HFC network 615 between server-side services providers (e.g., cable television/services providers) via a server-side head end 610 and a client-side customer via a STB 118 functionally connected to a customer receiving device, such as the television 116. As is understood by those skilled in the art, modern CATV systems 600 may provide a variety of services across the HFC network 615 including traditional digital and analog video programming, telephone services, high speed Internet access, video-on-demand, home security services, etc.

On the client side of the CATV system 600, digital and analog video programming and digital and analog data are provided to the television 116 via the STB 118. Interactive television services that allow a customer to input data to the CATV system 600 likewise are provided by the STB 118. As illustrated in FIG. 6, the STB 118 is a multipurpose computing device having a computer processor, memory, and an input/output mechanism. The input/output mechanism receives input from server-side processes via the HFC network 615 and from customers via input devices such as the remote control device 628 (e.g., remote control 117), keyboard 630, or other computing device 112, such as a tablet/slate computer 114, smart phone 110, etc. The remote control device 628 and the keyboard 630 may communicate with the STB 118 via a suitable communication transport such as the infrared connection 632. The remote control device 628 may include a biometric input module 629. The STB 118 also includes a video processor for processing and providing digital and analog video signaling to the television 116 via a cable communication transport 634. A multi-channel tuner is provided for processing video and data to and from the STB 118 and the server-side head end system 610, described below.

The STB 118 also includes an operating system 622 for directing the functions of the STB 118 in conjunction with a variety of client applications 625. For example, if a client application 625 requires personalizations to be displayed on the television 116, the operating system 622 may cause the graphics functionality and video processor of the STB 118, for example, to output personalization data to the television 116 at the direction of the client application 625.

Because a variety of different operating systems 622 may be utilized by a variety of different brands and types of set-top boxes, a middleware layer 624 may be provided to allow a given software application to be executed by a variety of different operating systems. According to an embodiment, the middleware layer 624 may include a set of application programming interfaces (APIs) that are exposed to client applications and operating systems 622 that allow client applications to communicate with the operating systems through common data calls understood via the API set. As described below, a corresponding middleware layer is included on the server side of the CATV system 600 for facilitating communication between the server-side application server and the client-side STB 118. The middleware layer 642 of the server-side application server and the middleware layer 624 of the client-side STB 118 may format data passed between the client side and server side according to the Extensible Markup Language (XML).

According to one embodiment, the STB 118 passes digital and analog video and data signaling to the television 116 via a one-way communication transport 634. According to other embodiments, two-way communication transports may be utilized, for example, via high definition multimedia (HDMI) ports. The STB 118 may receive video and data from the server side of the CATV system 600 via the HFC network 615 through a video/data downlink and data via a data downlink. The STB 118 may transmit data from the client side of the CATV system 600 to the server side of the CATV system 600 via the HFC network 615 via one data uplink. The video/data downlink is an "in band" downlink that allows for digital and analog video and data signaling from the server side of the CATV system 600 through the HFC network 615 to the STB 118 for use by the STB 118 and for distribution to the television 116.

The data downlink and the data uplink, illustrated in FIG. 6, between the HFC network 615 and the STB 118 comprise "out of band" data links. As is understand by those skilled in the art, the "out of band" frequency range is generally at a lower frequency than "in band" signaling. Data flow between the STB 118 and the server-side application server 640 is typically passed through the "out of band" data links. Alternatively, an "in band" data carousel may be positioned in an "in band" channel into which a data feed may be processed from the application server 640 through the HFC network 615 to the STB 118. Operation of data transport between components of the CATV system 600, described with reference to FIG. 6, is well known to those skilled in the art.

Referring still to FIG. 6, the head end 610 of the CATV system 600 is positioned on the server side of the CATV system and includes hardware and software systems responsible for originating and managing content for distributing through the HFC network 615 to client-side STBs for presentation to customers. As described above, a number of personalized services may be provided by the CATV system 600, including digital and analog video programming, interactive television services, telephone services, video-on-demand services, targeted advertising, etc.

The application server 640 can be configured as a computing system operative to assemble and manage data sent to and received from the STB 118 via the HFC network 615. As described above, the application server 640 includes a middleware layer 642 for processing and preparing data from the head end of the CATV system 600 for receipt and use by the client-side STB 118. For example, content metadata of a third-party content provider service may be downloaded by the application server 640 via the Internet 644. When the application server 640 receives the downloaded content metadata, the middleware layer 642 may be utilized to format the content metadata for receipt and use by the STB 118.

According to one embodiment, data obtained and managed by the middleware layer 642 of the application server 640 is formatted according to the Extensible Markup Language and is passed to the STB 118 through the HFC network 615 where the XML-formatted data may be utilized by a client application 625 in concert with the middleware layer 624, as described above. As should be appreciated by those skilled in the art, a variety of third-party services data, including news data, weather data, sports data and other information content may be obtained by the application server 640 via distributed computing environments such as the Internet 644 for provision to customers via the HFC network 615 and the STB 118. According to embodiments, client application 640 may include the client 108 described herein.

According to embodiments, the application server 640 obtains customer support services data, including billing data, information on customer work order status, answers to frequently asked questions, services provider contact information, and the like from data services 126 for provision to the customer via an interactive television session. The data services 126 include a number of services operated by the services provider of the CATV system 600 which may include profile and other data associated with a given customer.

A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

A customer information database 668 may include general information about customers such as place of employment, business address, business telephone number, and demographic information such as age, gender, educational level, and the like. The customer information database 668 may also include general customer information such as answers to frequently asked customer questions and contact information for various service provider offices/departments. As should be understood, this information may be stored in a variety of disparate databases operated by the cable services provider.

Referring still to FIG. 6, web services system 650 is illustrated between the application server 640 and the data services 126. According to embodiments, web services system 650 serves as a collection point for data requested from each of the disparate data services systems comprising the data services 126. According to embodiments, when the application server 640 requires customer services data from one or more of the data services 126, the application server 640 passes a data query to the web services system 650. The web services system formulates a data query to each of the available data services systems for obtaining any required data for a requesting customer as identified by a set-top box or other identification associated with the customer.

The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above. An authentication system 666 may include information such as secure user names, subscriber profiles, subscriber IDs, biometric and/or physiological data, and/or passwords utilized by customers for access to network services. As should be understood by those skilled in the art, the disparate systems 650, 662, 666, 668 may be integrated or provided in any combination of separate systems, wherein FIG. 6 shows only one example.

Figure 7:
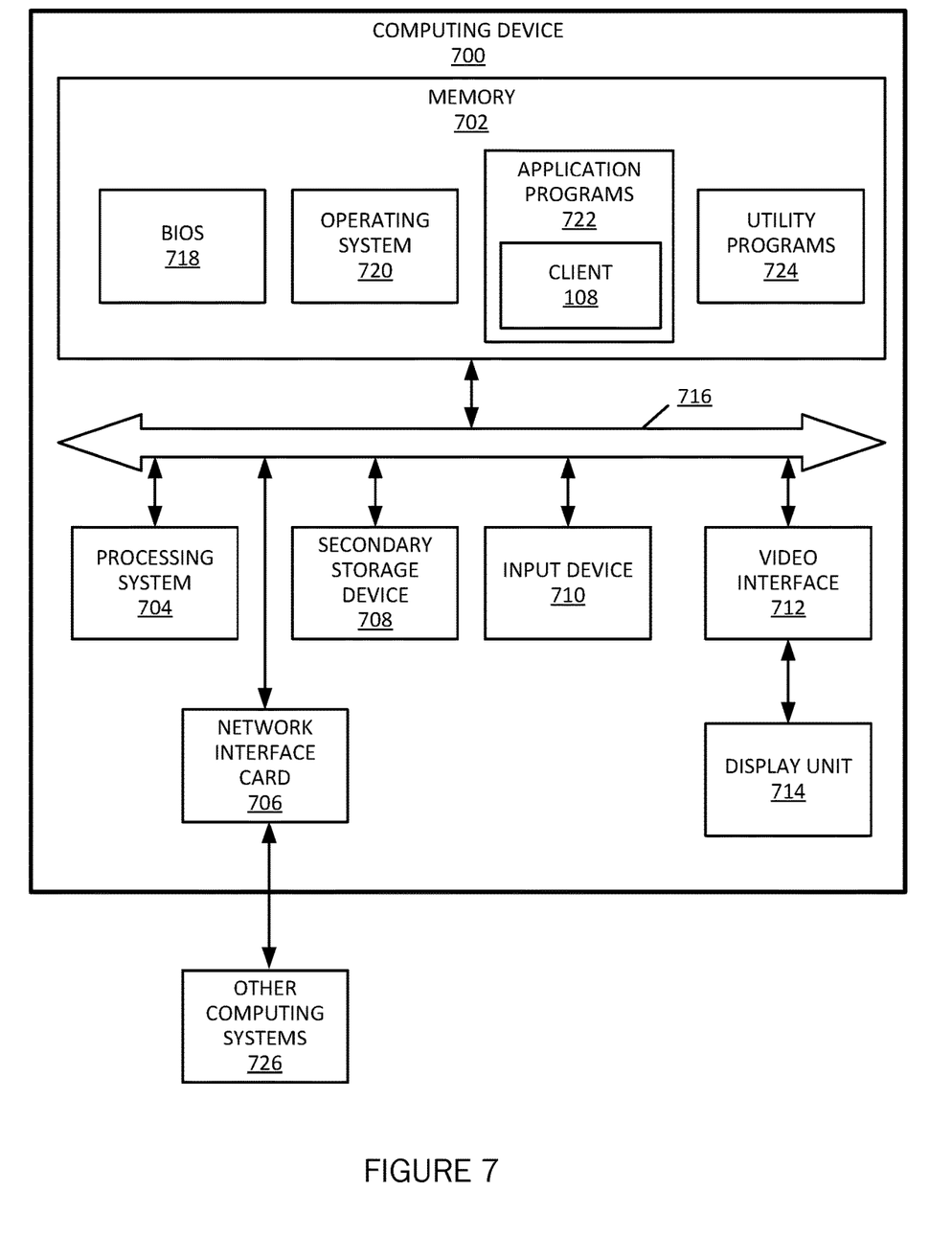
FIG. 7 is a block diagram illustrating example physical components of a computing device with which embodiments may be practiced.

FIG. 7 is a block diagram illustrating example physical components of a computing device 700 with which embodiments may be practiced. In some embodiments, one or a combination of the components 108, 110, 112, 114, 116, 118, 120, 122, 124, 126 of system 100 may be implemented using one or more computing devices like the computing device 700. It should be appreciated that in other embodiments, components 108, 110, 112, 114, 116, 118, 120, 122, 124, 126 of system 100 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, the client 108 may be stored locally on computing device 700. Memory 702 thus may store the computer-executable instructions that, when executed by processor 704, cause the client 108 to allow users to receive recommendations associated with a user mood according to sensor data, as described above.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., WIFI, WIMAX, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media. The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the client 108. The memory 702 also stores one or more utility programs 724 that, when executed by the processing system 704, cause the computing device 700 to provide utilities to other software programs.

Figures 8A, 8B:
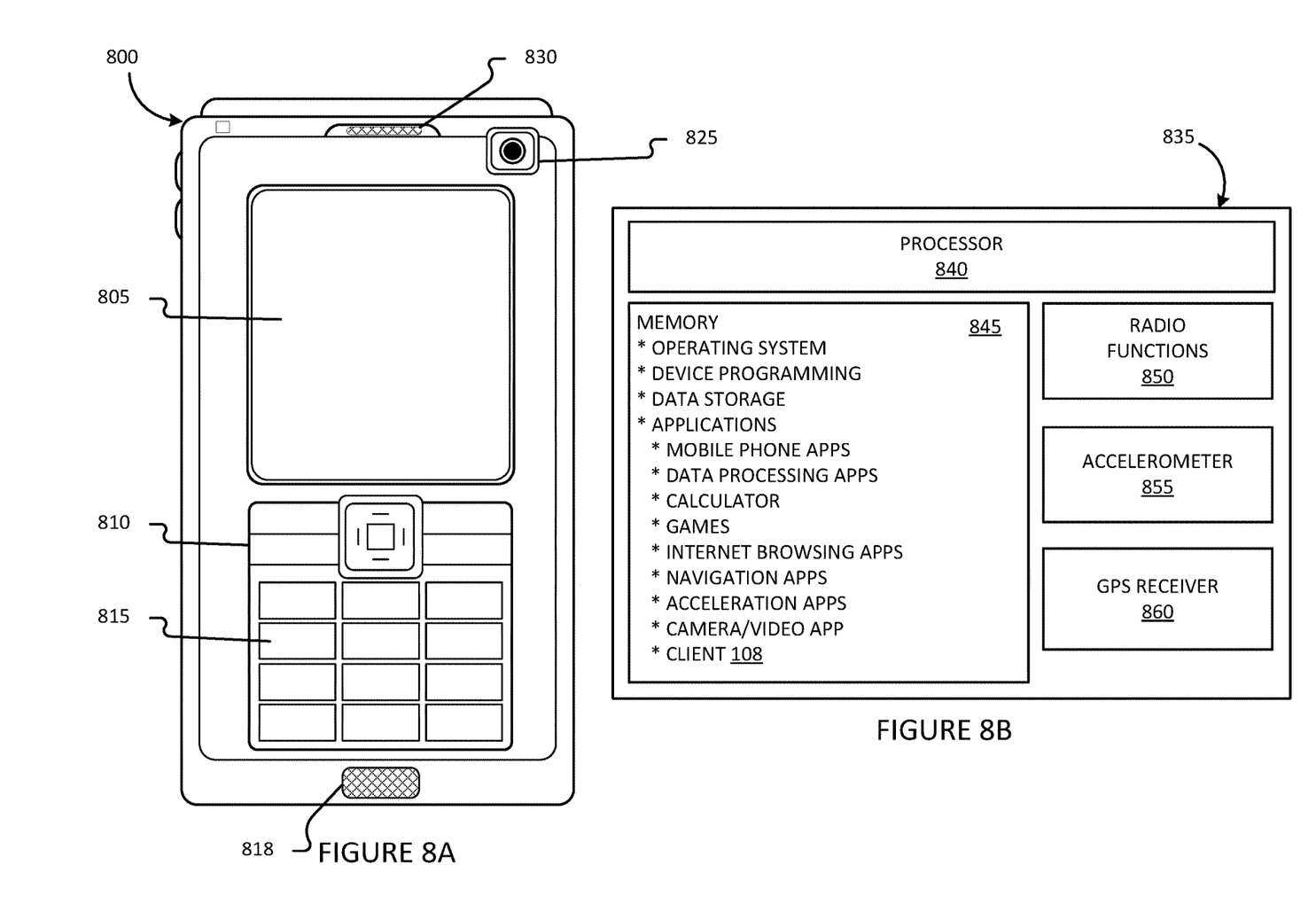
FIGS. 8A-8B illustrate a suitable mobile computing environment with which embodiments may be practiced.

FIGS. 8A-8B illustrate a suitable mobile computing environment, for example, a mobile computing device or smart phone 110, a tablet personal computer 114, a laptop computer 112, and the like, with which embodiments may be practiced. The mobile computing device 800 is illustrative of any suitable device operative to send, receive and process wireless communications. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the device 800, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client 108 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device location.

Although described herein in combination with mobile computing device 800, in alternative embodiments aspects may be used in combination with any number of computer systems, such as in desktop environments, laptop or notebook computer systems, multiprocessor systems, microprocessor based or programmable consumer electronics, networked PCs, mini computers, main frame computers and the like. Embodiments may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:
1. A system comprising:
a processor;

a remote control device equipped with a first type of sensor to output a first type of sensor data and a second type of sensor to output a second type of sensor data; and a memory storage device, including instructions that when executed by the processor cause the system to:

enable registration of the first type of sensor that allows a user to define first mapping parameters according to the first type of sensor data to map a first mood type to a first recommended program type;

register the first mapping parameters defined by the user according to the first type of sensor data mapping the first mood type to the first recommended program type;

enable registration of the second type of sensor that allows the user to define second mapping parameters according to the second type of sensor data to map a second mood type to a second recommended program type;

register the second mapping parameters defined by the user according to the second type of sensor data mapping the second mood type to the second recommended program type;

store the first and the second mapping parameters in a sensor mapping database that includes various sensor types and mappings between sensed mood types and recommended content items;

receive sensor data from the remote control device corresponding to the first type of sensor data output from the first type of sensor and the second type of sensor data output from the second type of sensor associated with detection of biometric and/or physiological attributes of at least one human subject comprising a current user of the system handling the remote control device;

determine a mood of the at least one human subject handling the remote control device comprising the current user of the system based on the sensor data comprising the first type of sensor data and the second type of sensor data;

validate the mood of the at least one human subject handling the remote control device by using: the first type of sensor data output from the first type of sensor for the second type of sensor data output from the second type of sensor, the second type of sensor data output from the second type of sensor for the first type of sensor data output from the first type of sensor, and/or a third type of sensor data output from a third type of sensor for either of the first type of sensor data output from the first type of sensor and/or the second type of sensor data output from the second type of sensor;

identify viewing recommendations for the current user of the system based on the mood of the current user of the system derived from the sensor data including identifying one or more first viewing recommendations according to the registered mapping parameters for the first type of sensor data output from the first type of sensor and identifying one or more second viewing recommendations according to the registered mapping parameters for the second type of sensor data output from the second type of sensor; and provide the viewing recommendations for the current user of the system for display on a display device.

2. The system of claim 1, further comprising a remote control device equipped with the one or more sensors to detect the sensor data comprising one or more of heartbeat data, skin temperature data, skin conductivity data, and/or applied force data.

3. The system of claim 1, further operable to receive sensor data from one of a wearable device, a digital camera, a smart phone, a tablet computer, a laptop computer, or a remote control apparatus.

4. The system of claim 1, further comprising at least one digital camera and a facial recognition algorithm to determine the mood based in part on an output of the at least one digital camera.

5. The system of claim 1, further operable to use the sensor mapping database to map sensor parameters to the viewing recommendations associated with television programming and other services provided by a service provider network.

6. The system of claim 1, further operable to receive opt-in data in order to use collected sensor data to identify the viewing recommendations.

7. The system of claim 1, further operable to filter the viewing recommendations based on the mood with one or more of gender, age, or time of day or year to display one or more recommended television shows or movies that are currently airing or airing at some other defined viewing time.

8. The system of claim 1, further comprising at least one digital camera or a microphone to determine the mood based in part on an output of the at least one digital camera or the microphone while the user handles the remote control device.

9. The system of claim 1, further to determine a first mood type from the sensor data and identify the viewing recommendations based on the first mood type.

10. The system of claim 9, further to filter the viewing recommendations based on one or more of an identity, a gender type, an age or age range, or an ethnicity type.

11. The system of claim 10, wherein the viewing recommendations include one or more of one or more recommended channels, a recommended programming guide view, one or more recommended video on demand items, and one or more recommended advertisements.

12. A method comprising:

enabling registration of a first type of sensor that allows a user to define first mapping parameters according to a first type of sensor data to map a first mood type to a first recommended program type;

registering the first mapping parameters defined by the user according to the first type of sensor data mapping the first mood type to the first recommended program type;

enabling registration of a second type of sensor that allows the user to define second mapping parameters according to a second type of sensor data to map a second mood type to a second recommended program type;

registering the second mapping parameters defined by the user according to the second type of sensor data mapping the second mood type to the second recommended program type;

storing the first and the second mapping parameters in a sensor mapping database that includes various sensor types and mappings between sensed mood types and recommended content items;

receiving sensor data from a remote control device equipped with the first type of sensor to output the first type of sensor data and the second type of sensor to output the second type of sensor data, wherein the sensor data corresponds to the first type of sensor data output from the first type of sensor and the second type of sensor data output from the second type of sensor associated with detecting biometric and/or physiological attributes of at least one human subject comprising a current user handling the remote control device;

determining a mood of the at least one human subject comprising the current user handling the remote control device based on the sensor data comprising the first type of sensor data and the second type of sensor data;

validating the mood of the at least one human subject handling the remote control device by using: the first type of sensor data output from the first type of sensor for the second type of sensor data output from the second type of sensor, the second type of sensor data output from the second type of sensor for the first type of sensor data output from the first type of sensor, and/or a third type of sensor data output from a third type of sensor for either of the first type of sensor data output from the first type of sensor and/or the second type of sensor data output from the second type of sensor;

identifying viewing recommendations for the current user that include television programs and movies based on the mood of the current user derived from the sensor data including identifying one or more first viewing recommendations according to registered mapping parameters for the first type of sensor data output from the first type of sensor and identifying one or more second viewing recommendations according to registered mapping parameters for the second type of sensor data output from the second type of sensor; and providing the viewing recommendations for the current user for display.

13. The method of claim 12, further comprising using output from the remote control device to detect heartbeat data, skin temperature data, skin conductivity data, and/or applied force data.

14. The method of claim 12, further comprising receiving the sensor data from one of a digital camera, a smart phone, a tablet computer, or a laptop computer.

15. The method of claim 12, further comprising using the sensor mapping database to map sensor parameters to the viewing recommendations associated with television programming and/or other services provided by a service provider network.

16. The method of claim 12, further comprising filtering the viewing recommendations based on the mood with one or more of gender, age, or time of day or year to display one or more recommended television shows or movies that are currently airing or airing at some other defined viewing time.

17. The method of claim 12, further comprising using at least one digital camera or a microphone to determine the mood based on an output of the at least one digital camera or the microphone while the human subject handles the remote control device.

18. A non-transitory computer readable medium that includes instructions which, when executed, operate to:

enable registration of a first type of sensor that allows a user to define first mapping parameters according to a first type of sensor data to map a first mood type to a first recommended program type;

register the first mapping parameters defined by the user according to the first type of sensor data mapping the first mood type to the first recommended program type;

enable registration of a second type of sensor that allows the user to define second mapping parameters according to a second type of sensor data to map a second mood type to a second recommended program type;

register the second mapping parameters defined by the user according to the second type of sensor data mapping the second mood type to the second recommended program type;

store the first and the second mapping parameters in a sensor mapping database that includes various sensor types and mappings between sensed mood types and recommended content items;

send sensor data from a remote control device equipped with the first type of sensor that outputs the first type of sensor data and the second type of sensor that outputs the second type of sensor data associated with detection of biometric and/or physiological attributes of at least one human subject comprising a current user handling the remote control device to a server computer;

receive viewing recommendations for the current user based on a mood of the current user derived from the sensor data including identifying one or more first viewing recommendations according to registered mapping parameters for the first type of sensor data output from the first type of sensor and identifying one or more second viewing recommendations according to registered mapping parameters for the second type of sensor data output from the second type of sensor, wherein the mood of the at least one human subject handling the remote control device is validated by using: the first type of sensor data output from the first type of sensor for the second type of sensor data output from the second type of sensor, the second type of sensor data output from the second type of sensor for the first type of sensor data output from the first type of sensor, and/or a third type of sensor data output from a third type of sensor for either of the first type of sensor data output from the first type of sensor and/or the second type of sensor data output from the second type of sensor; and output the viewing recommendations for the current user for display.

19. The non-transitory computer readable medium of claim 18, further operable to receive the sensor data from the remote control device and from one or more other sensing devices.

20. The non-transitory computer readable medium of claim 19, further operable to use output from at least one digital camera and a facial recognition algorithm to determine the mood based in part on the output of the at least one digital camera.

* * * * *